US011893304B2

(12) United States Patent
Tachibana (10) Patent No.: US 11,893,304 B2
(45) Date of Patent: Feb. 6, 2024

(54) DISPLAY CONTROL METHOD, DISPLAY CONTROL DEVICE, AND PROGRAM

(71) Applicant: Yamaha Corporation, Shizuoka (JP)

(72) Inventor: Makoto Tachibana, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 580 days.

(21) Appl. No.: 17/119,471

(22) Filed: Dec. 11, 2020

(65) Prior Publication Data

US 2021/0096808 A1    Apr. 1, 2021

Related U.S. Application Data

(63) Continuation of application No. PCT/JP2019/022750, filed on Jun. 7, 2019.

(30) Foreign Application Priority Data

Jun. 15, 2018    (JP) .................. 2018-114444

(51) Int. Cl.
*G06F 3/16*   (2006.01)
*G10H 7/00*   (2006.01)
*G10L 13/04*  (2013.01)

(52) U.S. Cl.
CPC ............ *G06F 3/16* (2013.01); *G10H 7/008* (2013.01); *G10H 2210/086* (2013.01); *G10H 2210/325* (2013.01); *G10L 13/04* (2013.01)

(58) Field of Classification Search
CPC .... G06F 3/16; G10H 7/008; G10H 2210/086; G10H 2210/325; G10L 13/04
USPC ........................................................ 84/622
See application file for complete search history.

(56) References Cited

U.S. PATENT DOCUMENTS

| | | | | |
|---|---|---|---|---|
| 6,245,984 B1* | 6/2001 | Aoki | ................... | G10H 1/0025 |
| | | | | 84/611 |
| 6,281,420 B1* | 8/2001 | Suzuki | ................... | G10H 7/008 |
| | | | | 84/626 |
| 2003/0154847 A1* | 8/2003 | Akazawa | ................ | G10H 7/02 |
| | | | | 84/627 |
| 2004/0070621 A1* | 4/2004 | Suzuki | ................ | G10H 1/0025 |
| | | | | 715/764 |
| 2014/0047971 A1* | 2/2014 | Akazawa | ............. | G10H 1/0008 |
| | | | | 84/609 |

(Continued)

FOREIGN PATENT DOCUMENTS

| | | | | |
|---|---|---|---|---|
| CN | 1873775 A | * | 12/2006 | ............ G10H 1/057 |
| CN | 109584910 B | * | 2/2021 | ........... G10H 1/0008 |

(Continued)

OTHER PUBLICATIONS

International Search Report in PCT/JP2019/022750, dated Jul. 10, 2019.

*Primary Examiner* — Christina M Schreiber
(74) *Attorney, Agent, or Firm* — Global IP Counselors, LLP (57) ABSTRACT

A display control method includes causing a display device to display a processing image in which a first image representing a note corresponding to a synthesized sound and a second image representing a sound effect are arranged in an area, in which a pitch axis and a time axis are set, in accordance with synthesis data that specify the synthesized sound generated by sound synthesis and the sound effect added to the synthesized sound.

15 Claims, 4 Drawing Sheets

(56) References Cited

U.S. PATENT DOCUMENTS

| | | | | |
|---|---|---|---|---|
| 2017/0352340 A1* | 12/2017 | Hata | ................ | G10H 1/368 |
| 2021/0096808 A1* | 4/2021 | Tachibana | .............. | G10H 7/008 |

FOREIGN PATENT DOCUMENTS

| | | | | | |
|---|---|---|---|---|---|
| FR | 2958068 | A1 | * | 9/2011 | ................ G10H 1/14 |
| JP | 2004151397 | A | * | 5/2004 | ............ G10H 1/0041 |
| JP | 3744216 | B2 | * | 2/2006 | ............ G10H 1/0575 |
| JP | 2013190595 | A | * | 9/2013 | |
| JP | 2013190595 | A | | 9/2013 | |
| JP | 2014098800 | A | * | 5/2014 | |
| JP | 2014098800 | A | | 5/2014 | |
| JP | 2015016822 | A | | 1/2015 | |

\* cited by examiner

DISPLAY CONTROL METHOD, DISPLAY CONTROL DEVICE, AND PROGRAM

CROSS-REFERENCE TO RELATED APPLICATIONS

This application is a continuation application of International Application No. PCT/JP2019/022750, filed on Jun. 7, 2019, which claims priority to Japanese Patent Application No. 2018-114444 filed in Japan on Jun. 15, 2018. The entire disclosures of International Application No. PCT/JP2019/022750 and Japanese Patent Application No. 2018-114444 are hereby incorporated herein by reference.

BACKGROUND

Technological Field

The present disclosure relates to a technology for displaying synthesis data used for sound synthesis.

Background Information

Sound synthesis technology for synthesizing desired voice in accordance with synthesis information that specifies a pronunciation period and a pitch for each note has been proposed in the known art. For example, Japanese Laid-Open Patent Application No. 2015-16822 discloses a configuration in which a user uses a piano roll type editing screen, in which a pitch axis corresponding to the pitch and a time axis corresponding to the time are set, to edit synthesis information while visually confirming the pitch, pronunciation character, and pronunciation period of each note constituting a musical piece. Musical note figures representing notes specified by the synthesis information are arranged on the editing screen.

SUMMARY

An object of one aspect of the present disclosure is for the user to easily ascertain the positional relationship between a synthesized sound and a sound effect. The present disclosure discloses a display control method and a display control device for displaying synthesis data used for sound synthesis. Also, the present disclosure discloses other features and aspects of the disclosed display control method and the disclosed display control device.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

According to the present disclosure, a display control method according to one aspect of the present disclosure comprises causing a display device to display a processing image, in which a first image representing a note corresponding to a synthesized sound and a second image representing a sound effect are arranged in an area, in which a pitch axis and a time axis are set, in accordance with synthesis data that specify the synthesized sound generated by sound synthesis and the sound effect added to the synthesized sound.

A display control device according to one aspect of the present disclosure comprises an electronic controller including at least one processor, and the electronic controller is configured to execute a display control module that causes a display device to display a processing image in which a first image representing a note corresponding to a synthesized sound and a second image representing a sound effect are arranged in an area, in which a pitch axis and a time axis are set, in accordance with synthesis data that specify the synthesized sound generated by sound synthesis and the sound effect added to the synthesized sound.

First Embodiment

Figure 1:
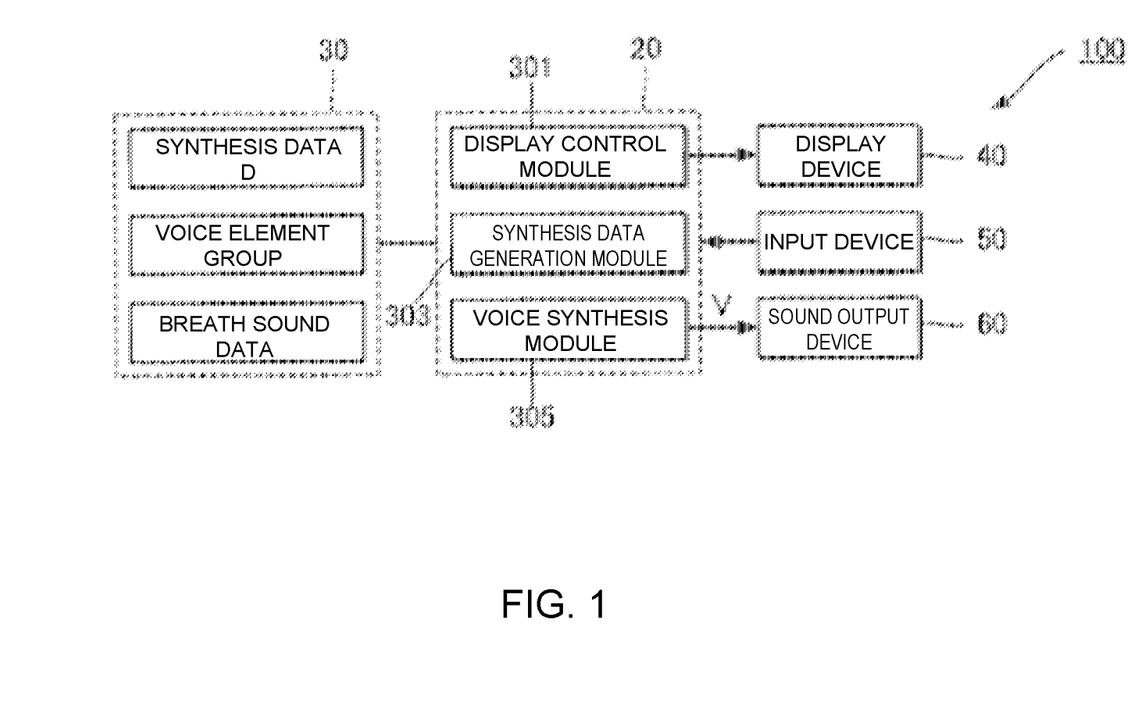
FIG. 1 is a block diagram illustrating a configuration of a voice synthesizing device according to a first embodiment.

FIG. 1 is a block diagram of a voice synthesizing device 100 according to the first embodiment. The voice synthesizing device 100 is, for example, a signal processing device that generates voice, such as a speaking voice or a singing voice by means of a concatenative voice synthesis process. In the first embodiment, a singing voice of a particular musical piece (hereinafter referred to as "synthesized musical piece") is generated by means of voice synthesis. The singing voice includes a sound that is the original object of the voice synthesis (hereinafter referred to as "synthesized sound") and a sound added to the synthesized sound (hereinafter referred to as "sound effect"). The synthesized sound is the sound of each note constituting the synthesized musical piece. The synthesized sound can be synthesized by means of a method other than concatenative synthesis. The sound effect, on the other hand, is a sound other than notes that constitutes a musical score of the synthesized musical piece. That is, a singing voice is a time series of a plurality of synthesized sounds to which sound effects are added. In the first embodiment, the sound of the breath (breathing) is exemplified as a sound effect.

As shown in FIG. 1, the voice synthesizing device 100 is realized by a computer system comprising an electronic controller (control device) 20, a storage device 30, a display device 40, an input device 50, and a sound output device 60. The display device 40 is a display, for example, a liquid-crystal display or an organic electroluminescent display. The display device 40 displays various images under the control of the electronic controller 20. The input device 50 is an operating unit (user operable input) that receives user instructions. For example, a plurality of operators such as a combination of a button, a switch, a lever, and/or a dial that are operated by the user, or/and a touch panel that detects contact with the display surface of the display device 40 is used as the input device 50. The sound output device 60 (for example, a speaker or headphones) emits the singing voice under the control of the electronic controller 20.

A program that is executed by the electronic controller 20 and various data that are used by the electronic controller 20 are stored in the storage device 30. A known storage medium, such as a magnetic storage medium or a semiconductor storage medium, or a combination of a plurality of various types of storage media can be freely employed as the storage device 30. In other words, the storage device 30 is any computer storage device or any computer readable medium with the sole exception of a transitory, propagating signal. The storage device 30 of the first embodiment stores synthesis data D, voice element group, and sound of the breath data.

Figure 2:
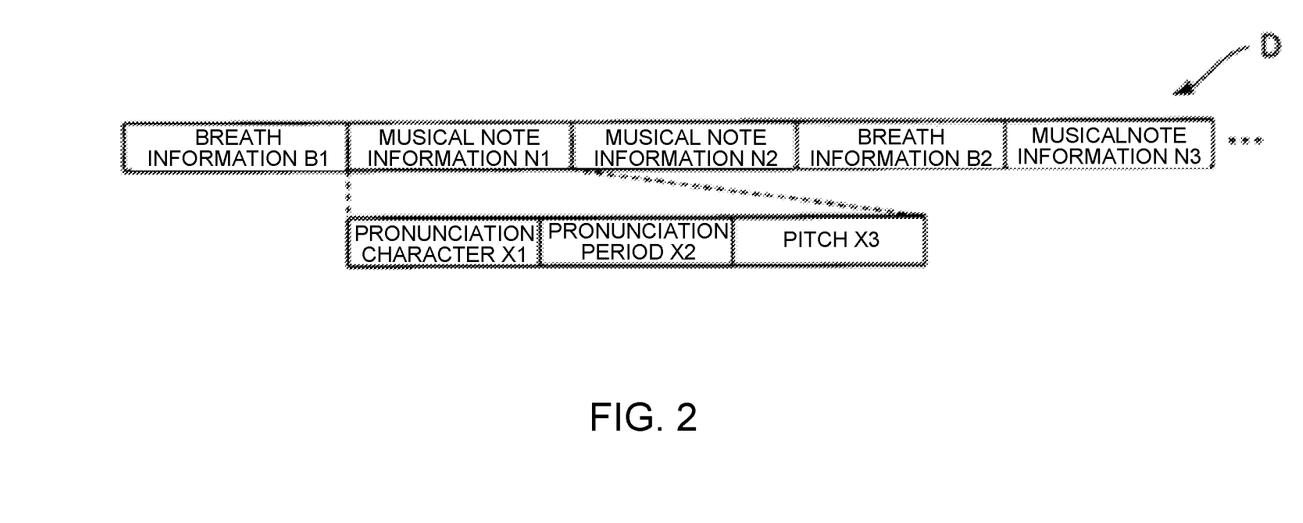
FIG. 2 is a schematic diagram of synthesis data.

FIG. 2 is a schematic diagram of the synthesis data D. The synthesis data D is time series data that specify the singing voice of the synthesized musical piece. Specifically, the synthesis data D specifies the synthesized sound and the sound effect (that is, the sound of the breath) that is added to the synthesized sound. The synthesis data D according to the first embodiment include, for each of a plurality of musical notes that constitute the synthesized musical piece, information specifying the synthesized sound corresponding to said musical note (hereinafter referred to as "note information") N and information specifying the sound of the breath (hereinafter referred to as "breath information") B that is added (inserted) immediately before a portion of the synthesized sound. The musical note information N and the breath information B are arranged in the order of pronunciation.

As shown in FIG. 2, the musical note information N (N1, N2, N3) is information specifying the note corresponding to the synthesized sound. Specifically, the musical note information N specifies a pronunciation character X1, a pronunciation period X2, and pitch (for example, note number) X3. The pronunciation character X1 is a symbol indicating a syllable (mora) composed of a single vowel, or a combination of a consonant and a vowel. The pronunciation period X2 is the time length (note value) of the note, for example, defined by a start time and a time length (duration) or an end time of the pronunciation. The musical note information N included in the synthesis data D is set by the user.

On the other hand, the breath information B (B1, B2, . . . ) is information that provides instructions for the insertion of the sounds of the breath in the musical score of the synthesized musical piece. Typically, the sound of the breath is pronounced immediately before a synthesized sound corresponding to a note is pronounced. Accordingly, the breath information B provides an instruction for insertion of the sound of the breath immediately before a note corresponding to the synthesized sound to which the sound of the breath should be added. A condition for selecting whether or not to add the sound of the breath to a synthesized sound (hereinafter referred to as "sound of the breath condition") is set in advance by the user. The sound of the breath condition is set in accordance with the type of the synthesized musical piece set by the user, for example. The method of setting the sound of the breath condition is not limited to the example described above. The breath information B is automatically set in accordance with the sound of the breath condition by the electronic controller 20. The sound of the breath corresponding to the breath information B that is automatically set is not pronounced immediately before all of the notes in the synthesized musical piece, but is pronounced immediately before particular notes in accordance with the sound of the breath condition. For example, the sound of the breath is added immediately before a note that immediately follows a long rest, or immediately before a note that is pronounced at high volume. The musical note information N and the breath information B are arranged in a time series in the order of pronunciation in the synthesized musical piece. The breath information B is arranged immediately before the musical note information N corresponding to the synthesized sound to which the sound of the breath is added. The waveform of the sound of the breath that is added to the synthesized sound is set in advance in accordance with the type of the synthesized musical piece, for example. The sound of the breath indicated by each piece of breath information B can be individually set by the user.

A voice element group is a collection of a plurality of voice elements (voice synthesis library). Each voice element is a phoneme unit (for example, a vowel or a consonant), which is the smallest unit of linguistic significance, or a phoneme chain (for example, a diphone or a triphone) in which a plurality of phonemes are connected, and is represented by the sample sequence of a time domain audio waveform or of the time series of the spectrum in the frequency domain calculated for each frame of the audio waveform. Each voice element is collected in advance from the recorded voice of a specific speaker, for example.

The sound of the breath data are data representing a waveform of the sound of the breath (hereinafter referred to as "breath waveform") over a prescribed time length. The sound of the breath is collected in advance from the recorded voice of a specific speaker, for example.

The electronic controller 20 (example of a computer) includes at least one processor formed of a processing circuit, such as a CPU (Central Processing Unit) and comprehensively controls each element of the voice synthesizing device 100. The term "electronic controller" as used herein refers to hardware that executes software programs. As shown in FIG. 1, the electronic controller 20 according to the first embodiment includes a display control module (display control unit) 301, a synthesis data generation module (synthesis data generation unit) 303, and a voice synthesis module (voice synthesis unit) 305. More specifically, the electronic controller 20 executes a program stored in the storage device 30 to realize (execute) a plurality of modules (functions) including the display control module 301, the synthesis data generation module 303, and the voice synthesis module 305. Some of the functions of the electronic controller 20 can also be realized by a dedicated electronic circuit. In addition, the function of the electronic controller 20 can be installed in a plurality of devices.

The display control module 301 causes the display device 40 to display various images. The display control module 301 according to the first embodiment causes the display device 40 to display a processing image G of FIG. 3 for the user to confirm and edit the content of the synthesized musical piece (note string) in accordance with the synthesis data D.

Figure 3:
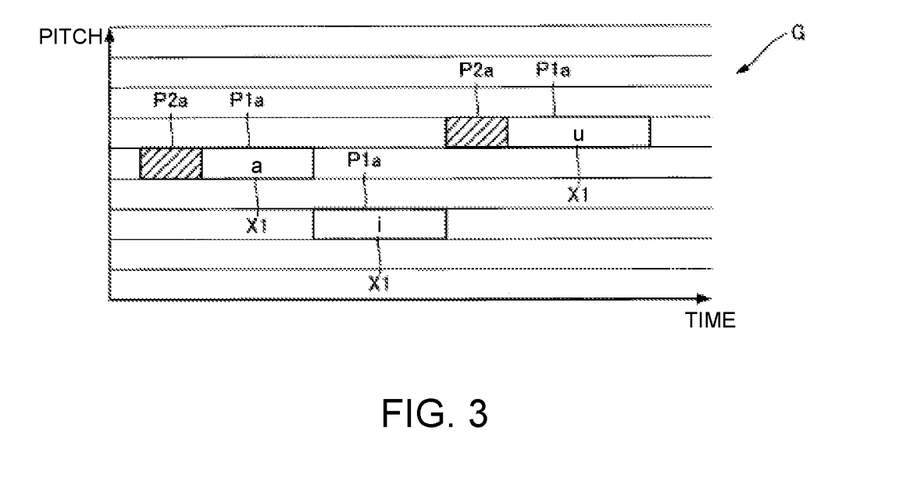
FIG. 3 is a view showing one example of a processing image.

FIG. 3 is a view showing one example of the processing image G. As shown in FIG. 3, the processing image G is an image in which a first image representing a note corresponding to a synthesized sound and a second image representing the sound of the breath are arranged in an area (piano roll type coordinate plane) in which the pitch axis and the time axis intersect are set. The first image and the second image are arranged in the processing image G by the display control module 301. The sound of the breath is basically a non-harmonic sound that does not have a clear pitch, so that the second image is arranged in an area different from the first image in the prior art.

The first image of the first embodiment is an image (hereinafter referred to as "note image") P1a whose length on the time axis is set, by the display control module 301, in accordance with the duration of each note. A rectangular note image P1*a* (note bar) is illustrated in FIG. 3. The length of the note image P1*a* on the time axis (image length) is set in accordance with the duration of the pronunciation period X2 indicated by the musical note information N of the note corresponding to the note image P1*a*.

The note image P1*a* is arranged in the processing image G in accordance with the musical note information N of the note corresponding to the note image P1*a*. The position of the note image P1*a* of each note in the pitch axis direction is set in accordance with a pitch X3 of the note indicated by the musical note information N on the pitch axis. On the other hand, the position of the note image P1*a* of each note in the time axis direction is set in accordance with the pronunciation period X2 of the note indicated by the musical note information N. As shown in FIG. 3, in the first embodiment, the pronunciation character X1 indicated by the musical note information N of each note is arranged in the processing image G together with the note image P1*a* of said note (for example, superimposed on the note image P1*a* as shown in FIG. 3).

The second image of the first embodiment is an image (hereinafter referred to as "breath image") P2*a* whose length on the time axis is set in accordance with the duration of each sound of the breath. A rectangular breath image P2*a* is illustrated in FIG. 3. The breath image P2*a* and the note image P1*a* have different display modes, such as pattern, color, and shape, so as to be visually distinguishable. The length of the breath image P2*a* of each sound of the breath on the time axis (display length) is set in accordance with the time length of the breath waveform of the sound of the breath indicated by the sound of the breath data stored in the storage device 30. That is, the display lengths of the plurality of breath images P2*a* arranged in the processing image G are the same. Breath images P2*a* having different display lengths can be arranged in the processing image G as well. For example, if the durations of the sounds of the breath are different, the display lengths of the breath images P2*a* are changed in accordance with the durations of the sounds of the breath.

In the first embodiment, the breath image P2*a* is arranged in the processing image G in accordance with the musical note information N immediately following the breath information B. The position of the breath image P2*a* in the pitch axis direction is set to the same position as the pitch X3 of the musical note information N immediately following the breath information B. That is, the breath image P2*a* is disposed at the position corresponding to the pitch X3 of the note corresponding to the synthesized sound immediately following the sound effect represented by the breath image P2*a*. The position of the breath image P2*a* in the time axis direction is set such that the end point of the breath image P2*a* (that is, the end time of the sound of the breath) matches the start time indicated by the pronunciation period X2 of the musical note information N immediately following the breath information B. That is, the note image P1*a* and the breath image P2*a* are connected and arranged in the time axis direction. The note image P1*a* and the breath image P2*a* can be not completely connected, and the note image P1*a* and the breath image P2*a* can be separated from each other. In particular, if a consonant that is pronounced before the start time of the note is included at the beginning of the synthesized sound that is generated in accordance with the musical note information N, the end time of the sound of the breath is set before the start time of the consonant.

By appropriately operating the input device 50 while visually checking the processing image G illustrated above, the user can provide an instruction to edit the musical note information N of the synthesis data D (generating new musical note information N or changing existing musical note information N), or provide an instruction to change the sound of the breath condition for adding the sound of the breath to the synthesized sound. For example, the user provides a various instructions for editing the note image P1*a* in the processing image G. For example, instructions for such edits as adding a new note image P1*a*, or deleting, moving, or expanding/contracting an existing note image P1*a* on the time axis can be provided. The electronic controller 20 edits the synthesis data D in accordance with the user's instruction with respect to the note image P1*a*.

The synthesis data generation module 303 of FIG. 1 manages the synthesis data D. Specifically, the synthesis data generation module 303 edits the synthesis data D in accordance with the user's instruction to the input device 50. For example, the synthesis data generation module 303 edits the synthesis data D so as to reflect the edited content of the processing image G. For example, if an instruction is provided to add the note image P1*a*, the musical note information N corresponding to the note image P1*a* is added, and if an instruction is provided to expand/contract the note image P1*a*, the pronunciation period X2 of the musical note information N is changed in accordance with the expansion/contraction of the note image P1*a*. In addition, the sound of the breath condition that is set is applied to the edited musical note information N. Specifically, whether to add the sound of the breath to the synthesized sound of the note indicated by the edited musical note information N is determined by the sound of the breath condition, and the breath information B immediately before the musical note information N is automatically edited (for example, added or deleted) in accordance with said determination. For example, if the musical note information N, which has the breath information B immediately therebefore is deleted, the breath information B is also deleted.

The voice synthesis module 305 generates a voice signal V by means of a voice synthesis process that utilizes the synthesis data D, the sound of the breath data, and voice element groups stored in the storage device 30. First, the voice synthesis module 305 sequentially selects the voice element corresponding to the pronunciation character X1 specified by each piece of musical note information N of the synthesis data D from a voice element group, expands/contracts each voice element in accordance with the pronunciation period X2 specified the musical note information N and connects them to each other in order to generate the voice signal. Second, the voice synthesis module 305 synthesizes the sound of the breath indicated by the breath data with the voice signal in order to generate the voice signal V of the singing voice. Supplying the voice signal V generated by the voice synthesis module 305 to the sound output device 60 reproduces the singing voice of the synthesized musical piece.

Figure 4:
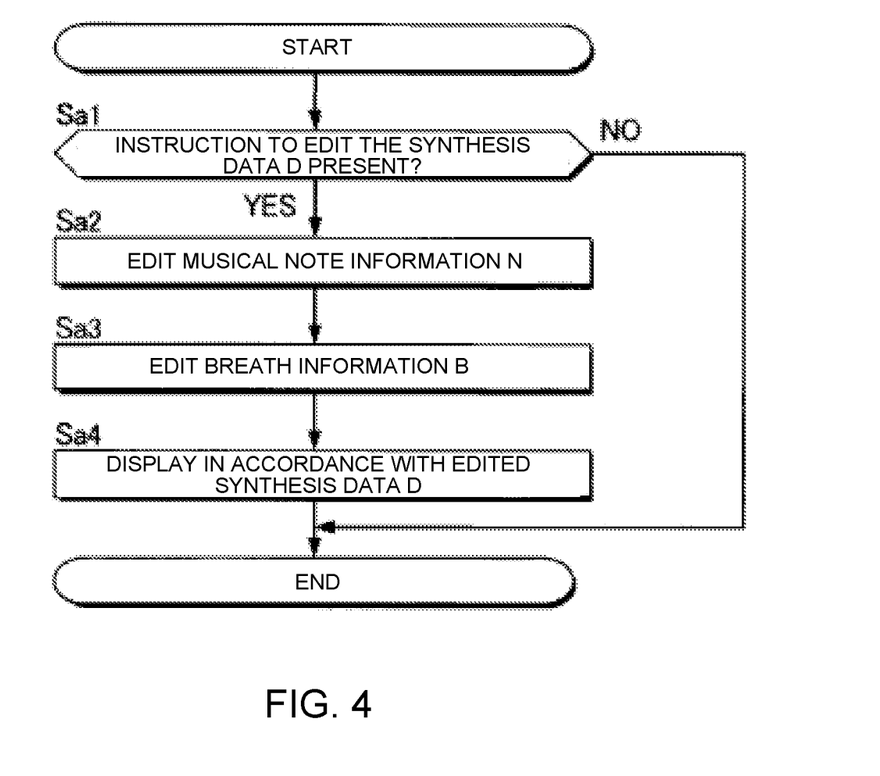
FIG. 4 is a flowchart of a process for displaying the processing image.

FIG. 4 is a flowchart of a process for displaying the processing image G. The process of FIG. 4 is started in response to the display of the processing image G, for example. The process of FIG. 4 is repeatedly executed at a prescribed interval while the processing image G is displayed, for example. When the process of FIG. 4 is started, the synthesis data generation module 303 determines the presence/absence of an instruction to edit the synthesis data D from the user (Sa1). If there is an instruction to edit the synthesis data D (Sa1: YES), the synthesis data generation module 303 edits the musical note information N of the synthesis data D in accordance with the user instruction (Sa2). The synthesis data generation module 303 edits the breath information B of the synthesis data D in accordance with the edited content of the musical note information N (Sa3). The synthesis data D are edited by means of the processes of Step Sa2 and Step Sa3. If the presence/absence of the sound of the breath does not change due to the editing of the musical note information N, the process of Step Sa3 can be omitted. The display control module 301 displays the processing image G in accordance with the edited synthesis data D (Sa4). On the other hand, if there is no instruction to edit the synthesis data D (Sa1: NO), the processes of Step Sa1 to Step Sa4 are not executed.

As can be understood from the foregoing explanation, in the first embodiment, the processing image G, in which the note image P1a and the breath image P2a are arranged in the area in which the pitch axis and the time axis are set, is displayed on the display device 40. Accordingly, for example, compared to a configuration in which the note image P1a and the breath image P2a are displayed in different areas, the user can easily ascertain the positional relationship between the synthesized sound and the sound of the breath. In addition, by means of the configuration of the first embodiment, in which the breath image P2a is displayed at the position corresponding to the pitch X3 of the note corresponding to the synthesized sound immediately after the sound of the breath, for example, compared to a configuration in which the breath image P2a of the sound of the breath is displayed independently of the pitch X3 of the note corresponding to the synthesized sound located near the sound of the breath, there is the remarkable effect that the user can easily ascertain the positional relationship between the synthesized sound and the sound of the breath.

Second Embodiment

The second embodiment of the present disclosure will be described. In each of the examples below, elements that have the same functions as in the first embodiment have been assigned the same reference symbols as those used to describe the first embodiment, and detailed descriptions thereof have been appropriately omitted.

Figure 5:
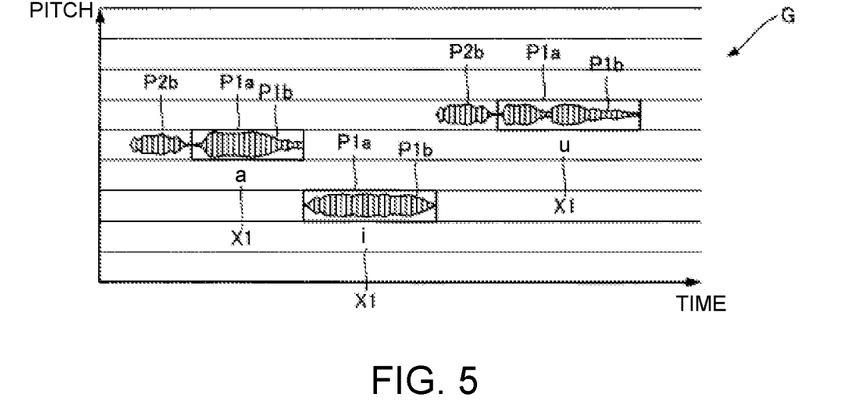
FIG. 5 is a view showing one example of the processing image according to a second embodiment.

FIG. 5 is a schematic diagram of the processing image G according to a second embodiment. In the second embodiment, an image including the same note image P1a as in the first embodiment, and an image representing the waveform of the synthesized sound (hereinafter referred to as "synthesized sound waveform image") P1b, is exemplified as the first image. In addition, an image representing the breath waveform (hereinafter referred to as "breath waveform image") P2b is exemplified as the second image.

The note image P1a according to the second embodiment is arranged in the processing image G with the display length and position corresponding to the musical note information N, in the same manner as in the first embodiment. The synthesized sound waveform image P1b is an image representing the waveform of the voice signal V generated by the voice synthesis module 305. An image representing the waveform envelope of the portion (that is, a section of the synthesized sound) of the voice signal V synthesized in accordance with each note is used as the synthesized sound waveform image P1b. The synthesized sound waveform image P1b is arranged, by the display control module 301, so as to be superimposed on the note image P1a. The image of the waveform envelope of the portion of the voice signal V corresponding to the sound of the breath is arranged immediately before the note image P1a as the breath waveform image P2b, by the display control module 301. That is, the breath image P2a is disposed at the position corresponding to the pitch X3 of the note corresponding to the synthesized sound immediately following the sound effect represented by the breath image P2a. The pronunciation character X1 is arranged, for example, around the first image (note image P1a and synthesized sound waveform image P1b).

The same effect as the first embodiment is realized in the second embodiment. In the first embodiment, since the first image includes the synthesized sound waveform image P1b, the user can visually ascertain the waveform of the synthesized sound. In addition, since the second image includes the breath waveform image P2b, the user can visually ascertain the waveform of the sound effect.

Third Embodiment

Figure 6:
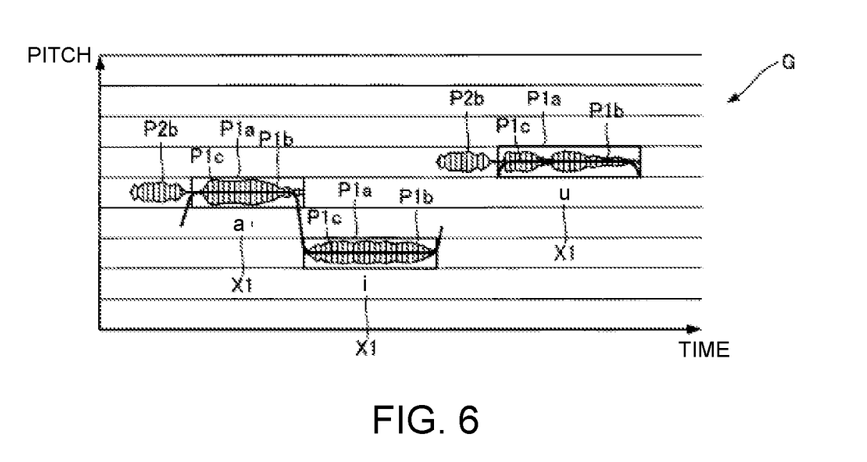
FIG. 6 is a view showing one example of the processing image according to a third embodiment.

FIG. 6 is a schematic diagram of the processing image G according to a third embodiment. The first image of the third embodiment includes an image P1c representing the temporal change of the pitch X3 of the synthesized sound (hereinafter referred to as "pitch image"), in addition to the same synthesized sound waveform image P1b and the note image P1a as those of the second embodiment. The second image is the same as that of the second embodiment.

A pitch image P1c is an image representing the change in the pitch of the singing voice generated by means of voice synthesis. An image representing the temporal change of the portion (that is, the synthesized sound) of the singing voice corresponding to each note is used as the pitch image P1c. The pitch image P1c is arranged, by the display control module 301, so as to be superimposed on the note image P1a and the synthesized sound waveform image P1b.

The same effect as the second embodiment is realized in the third embodiment. In the third embodiment, since the first image includes the pitch image P1c representing the temporal change of the pitch X3 of the synthesized sound, the user can visually ascertain the temporal change of the pitch X3 of the synthesized sound.

Modified Examples

Specific modified embodiments to be added to each of the embodiments exemplified above are illustrated below. A plurality of embodiments selected at random from the following examples can be appropriately combined as long as they are not mutually contradictory.

(1) The configurations of the embodiments described above can be applied to synthesized sound generated by means of musical sound synthesis for synthesizing instrument sounds, for example. Musical sound synthesis and voice synthesis exemplified in the embodiments described above are collectively expressed as sound synthesis. By means of the configuration of generating synthesized sound by means of musical sound synthesis, for example, a fret sound generated when a guitarist moves their fingers across the frets is exemplified as a sound effect that is added to the synthesized sound.

Examples of sound effects in voice synthesis include, in addition to the sound of the breath exemplified in the embodiments described above, various sounds that are produced orally by the performer (such as the clicking of the tongue, sighing, coughing, and sneezing). In addition, various sounds that are sounded using the performer's body (for example, clapping, applause, or finger snapping) can be exemplified as sound effects. For example, sounds such as the performer's footsteps, or the rustling of the performer's clothes can be used as sound effects.

Examples of sound effects in the musical sound synthesis include, in addition to the fret sound described above, the following sounds corresponding to the type of musical instrument. Examples of sound effects of wind instruments include the sound of the pressing an operation element or the sound of inhalation. Examples of sound effects of percussion instruments include various sounds derived from using drumsticks (such as the sounds made by striking a drumstick or dropping a drumstick) or shouts from the performer during a performance. Examples of sound effects of string instruments include tapping sounds picking noises or release noises.

(2) In the embodiments described above, the configuration of the first image is not limited to the examples described above. Any image can constitute the first image of each note, as long as it is at least one or more of the note image P1a, the synthesized sound waveform image P1b, or the pitch image P1c. The first image can also include an image other than the images exemplified above. For example, a figure representing the note indicated by each piece of musical note information N itself can be included in the first image. As can be understood from the foregoing explanation, the display mode (pattern, color, shape, etc.) of the first image is arbitrary, as long as the user can visually ascertain the information relating to the notes.

(3) In the first embodiment, the second image includes the breath image P2a, and in the second and third embodiments, the second image includes the breath waveform image P2b, but the image constituting the second image is not limited to the examples described above. For example, the second image can include both the breath image P2a and the breath waveform image P2b. The second image can also include an image other than the images exemplified above. The display mode of the second image is arbitrary as long as the user can visually ascertain the position at which the sound of the breath is inserted in the synthesized musical piece.

Figure 7:
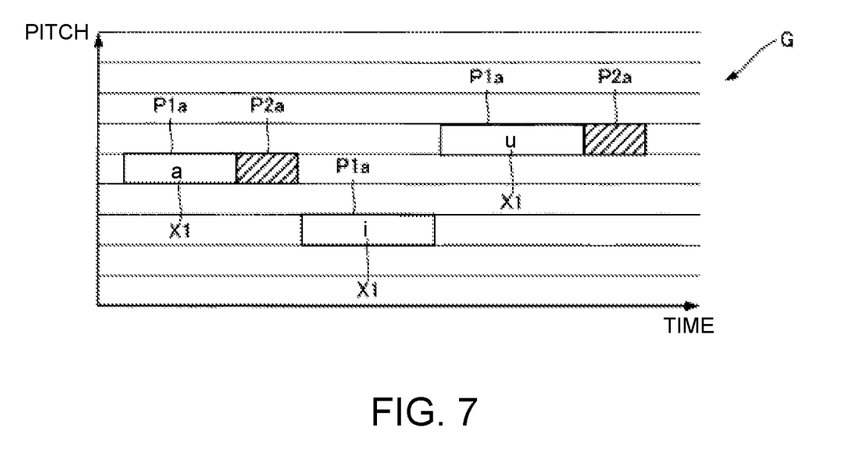
FIG. 7 is a view showing one example of the processing image according to a modified example.

(4) In the embodiments described above, the breath image P2a is disposed at the position corresponding to the pitch X3 of the note corresponding to the synthesized sound immediately after the sound effect represented by the breath image P2a, but the position at which to dispose the breath image P2a is not limited to the example described above. As shown in FIG. 7, the breath image P2a can be disposed in a position corresponding to the pitch X3 of the note corresponding to the synthesized sound immediately before the sound of the breath corresponding to the breath image P2a. Specifically, the breath image P2a is disposed in the processing image G in accordance with the musical note information N immediately before the breath information B. The position of the breath image P2a in the pitch axis direction is set to the pitch X3 of the musical note information N immediately before the breath information B. The position of the breath image P2a in the time axis direction is set such that the starting point of the breath image P2a matches the tail end (end time) of the pronunciation period X2 of the musical note information N immediately before the breath information B. By means of the configuration described above, for example, compared to a case in which the breath image P2a of the sound effect is displayed independently of the pitch X3 of the synthesized sound located near the sound of the breath, there is the remarkable effect that the user can easily ascertain the positional relationship between the synthesized sound and the sound of the breath.

(5) The breath information B exemplified in the embodiments described above can include various information regarding the sound of the breath. For example, the breath information B can specify the sound generation time of the sound of the breath. The sound generation time of the sound of the breath is arbitrarily set in accordance with the user's instruction, for example. In the configuration described above, the position on the time axis of the breath image P2a arranged in the processing image G is adjusted in accordance with the sound generation time indicated by the breath information B. In addition, the breath information B can specify the pitch used for the arrangement on the pitch axis of the processing image G. For example, the pitch specified by the breath information B can be set so as to match the pitch X3 specified by the musical note information N immediately after the breath information B. In the configuration described above, the breath image P2a is arranged in the processing image G in accordance with the pitch specified by the breath information B. Accordingly, the breath image P2a is disposed in the position corresponding to the pitch X3 of the note corresponding to the synthesized sound immediately following the sound effect represented by the breath image P2a. As described above, if a temporal relationship is defined between the musical note information N and the breath information B, it is not necessary to mix the musical note information N and the breath information B in the synthesis data D. That is, the musical note information N and the breath information B can be stored separately.

(6) In the embodiments described above, the sound of the breath can be changed in accordance with an instruction from the user to edit the second image. In the case that the user provides an instruction to expand/contract the second image on the time axis, the duration of the sound of the breath is changed in accordance with said instruction. Specifically, the sound generation time specified by the breath information B is edited in accordance with the instruction.

In addition, the user can provide an instruction to insert or delete the sound of the breath. Specifically, the user provides an instruction to add a new second image or to delete an existing second image in the processing image G. The editing of the synthesis data D is carried out in accordance with said instruction.

(7) In the embodiments described above, a configuration in which one item of sound of breath data is stored in the storage device 30 was exemplified, but a plurality of items of sound of the breath data, each representing a different breath waveform, can be stored in the storage device 30. For example, a plurality of items of sound of the breath data in which the genders or speakers are different are stored in the storage device 30. The user can select the desired items of sound of the breath data from the plurality of the items of sound of the breath data. In the configuration in which the breath waveform image P2b is displayed (second and third embodiments), the breath waveform image P2b representing the sound of the breath data selected by the user is arranged in the processing image G.

(8) In the embodiments described above, the display mode of the second image can be changed in accordance with an instruction from the user. For example, if the user provides an instruction to change the intensity of the sound of the breath, the width of the second image in the pitch axis direction is changed in accordance with said instruction. If there is an instruction to reduce the intensity of the sound of the breath, the width of the second image in the pitch axis direction is reduced. Additionally, if the user provides an instruction to change the frequency with which the sound of the breath is inserted in the musical piece, the number of the second images arranged in the processing image G is increased or decreased in accordance with said instruction.

(9) In the embodiments described above, the presence/absence of an addition of the sound of the breath is exemplified as the sound of the breath condition, but the intensity and the time length of the sound of the breath, and the like, can also be set as the sound of the breath condition. By means of the configuration described above, it is possible to automatically select and add an appropriate sound of the breath to the series of the musical note information N.

(10) In the embodiments described above, the second image is arranged in the processing image G so as to be connected to the first image in the time axis direction, but the second image can be arranged in the processing image G away from the first image in the time axis direction.

(11) A device comprising the display control module 301 exemplified in the embodiments described above functions as a display control device. Whether the display control device is equipped with the voice synthesis module 305 and the synthesis data generation module 303 is arbitrary. That is, the voice synthesizing device 100 is one example of the display control device.

(12) The function of the display control device according to each of the above-described embodiments is realized by means of cooperation between the electronic controller 20 and a program, as is illustrated in each of the above-described embodiments. The program according to each of the above-described embodiments can be stored on a computer-readable storage medium and installed on a computer. The storage medium is, for example, a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media. Furthermore, the program can be delivered to a computer in the form of distribution via a communication network.

Aspects

For example, the following configurations may be understood from the embodiments as exemplified above.

A display control method according to one aspect (first aspect) of the present disclosure comprises causing a display device to display a processing image, in which a first image representing a note corresponding to a synthesized sound, and a second image representing a sound effect, are arranged in an area in which the pitch axis and the time axis are set, in accordance with synthesis data that specify the synthesized sound generated by means of sound synthesis and the sound effect added to the synthesized sound. By means of the aspect described above, since a processing image, in which a first image representing a note corresponding to the synthesized sound and a second image representing a sound effect are arranged, is displayed in an area in which a pitch axis and a time axis are set, for example, compared to a configuration in which the first image and the second image are displayed in different areas, the user can easily ascertain the positional relationship between the synthesized sound and the sound effect.

In one example (second aspect) of the first aspect, the second image is arranged in a position corresponding to the pitch of a note corresponding to a synthesized sound immediately following a sound effect represented by the second image. By means of the aspect described above, since the second image of the sound effect is displayed in a position corresponding to the pitch of the note corresponding to the synthesized sound immediately following the sound effect, compared to a configuration in which the second image of the sound effect is displayed independently of the pitch of the note corresponding to the synthesized sound located near the sound effect, there is the remarkable effect that the user can easily ascertain the positional relationship between the synthesized sound and the sound effect.

In one example (third aspect) of the first aspect, the second image is arranged in a position corresponding to the pitch of a note corresponding to a synthesized sound immediately before a sound effect represented by the second image. By means of the aspect described above, since the second image of the sound effect is displayed in a position corresponding to the pitch of the note corresponding to the synthesized sound immediately following the sound effect, compared to a configuration in which the second image of the sound effect is displayed independently of the pitch of the note corresponding to the synthesized sound located near the sound effect, there is the remarkable effect that the user can easily ascertain the positional relationship between the synthesized sound and the sound effect.

In one example (fourth aspect) of any one of the first to the third aspects, the first image includes a note image whose length on the time axis is set in accordance with the duration of the note. By means of the aspect described above, since the first image includes the note image whose length on the time axis is set in accordance with the duration of the note, the user can visually ascertain the duration of the synthesized sound.

In one example (fifth aspect) of the fourth aspect, the first image includes a waveform image representing the waveform of the synthesized sound. By means of the aspect described above, since the first image includes the waveform image representing the waveform of the synthesized sound, the user can visually ascertain the waveform of the synthesized sound.

In one example (sixth aspect) of the fourth or the fifth aspect, the first image includes a pitch image representing the temporal change of the pitch of the synthesized sound. By means of the aspect described above, since the first image includes the pitch image representing the temporal change of the pitch of the synthesized sound, the user can visually ascertain the temporal change of the pitch of the synthesized sound.

In one example (seventh aspect) of any one of the first to the sixth aspects, the second image includes a waveform image representing the waveform of the sound effect. By means of the aspect described above, since the second image includes the waveform image representing the waveform of the sound effect, the user can visually ascertain the waveform of the synthesized sound and the sound effect.

A display control device according to one aspect (eighth aspect) of the present disclosure comprises a display control unit for causing a display device to display a processing image, in which a first image representing a note corresponding to a synthesized sound, and a second image representing a sound effect, are arranged in an area in which the pitch axis and the time axis are set, in accordance with synthesis data that specify the synthesized sound generated by means of sound synthesis and the sound effect added to the synthesized sound. By means of the aspect described above, since a processing image, in which a first image representing a note corresponding to the synthesized sound and a second image representing a sound effect are arranged, is displayed in an area in which a pitch axis and a time axis are set, for example, compared to a configuration in which the first image and the second image are displayed in different areas, the user can easily ascertain the positional relationship between the synthesized sound and the sound effect.

In one example (ninth aspect) of the eighth aspect, the display control unit arranges the second image in a position corresponding to a pitch of a note corresponding to a synthesized sound immediately following a sound effect represented by the second image. By means of the aspect described above, since the second image of the sound effect is displayed in a position corresponding to the pitch of the note corresponding to the synthesized sound immediately following the sound effect, compared to a configuration in which the second image of the sound effect is displayed independently of the pitch of the note corresponding to the synthesized sound located near the sound effect, there is the remarkable effect that the user can easily ascertain the positional relationship between the synthesized sound and the sound effect.

In one example (tenth aspect) of the eighth aspect, the display control unit arranges the second image in a position corresponding to a pitch of a note corresponding to a synthesized sound immediately before a sound effect represented by the second image. By means of the aspect described above, since the second image of the sound effect is displayed in a position corresponding to the pitch of the note corresponding to the synthesized sound immediately following the sound effect, compared to a configuration in which the second image of the sound effect is displayed independently of the pitch of the note corresponding to the synthesized sound located near the sound effect, there is the remarkable effect that the user can easily ascertain the positional relationship between the synthesized sound and the sound effect.

In one example (eleventh aspect) of any one of the eighth to the tenth aspects, the first image includes a note image whose length on the time axis is set in accordance with the duration of the note. By means of the aspect described above, since the first image includes the note image whose length on the time axis is set in accordance with the duration of the note, the user can visually ascertain the duration of the synthesized sound.

In one example (twelfth aspect) of the eleventh aspect, the first image includes a waveform image representing the waveform of the synthesized sound. By means of the aspect described above, since the first image includes the waveform image representing the waveform of the synthesized sound, the user can visually ascertain the waveform of the synthesized sound.

In one example (thirteenth aspect) of the eleventh or the twelfth aspect, the first image includes a pitch image representing the temporal change of the pitch of the synthesized sound. By means of the aspect described above, since the first image includes the pitch image representing the temporal change of the pitch of the synthesized sound, the user can visually ascertain the temporal change of the pitch of the synthesized sound.

In one example (fourteenth aspect) of any one of the eighth to the thirteenth aspects, the second image includes a waveform image representing the waveform of the sound effect. By means of the aspect described above, since the second image includes the waveform image representing the waveform of the sound effect, the user can visually ascertain the waveform of the sound effect.

A program according to one aspect (fifteenth aspect) of the present disclosure causes a computer to function as a display control unit for causing a display device to display a processing image, in which a first image representing a note corresponding to a synthesized sound, and a second image representing a sound effect, are arranged in an area in which the pitch axis and the time axis are set, in accordance with synthesis data that specify the synthesized sound generated by means of sound synthesis and the sound effect added to the synthesized sound. By means of the aspect described above, since a processing image, in which a first image representing a note corresponding to the synthesized sound and a second image representing a sound effect are arranged, is displayed in an area in which a pitch axis and a time axis are set, for example, compared to a configuration in which the first image and the second image are displayed in different areas, the user can easily ascertain the positional relationship between the synthesized sound and the sound effect.

What is claimed is:

1. A display control method comprising:
causing a display device to display a processing image in which a first image representing a note corresponding to a synthesized sound generated by sound synthesis and a second image representing a sound effect added to the synthesized sound are arranged in an area, in which a pitch axis and a time axis are set, in accordance with synthesis data that specify the synthesized sound and the sound effect.

2. The display control method according to claim 1, further comprising
arranging the second image at a position corresponding to a pitch of the note corresponding to the synthesized sound, the synthesized sound immediately following the sound effect.

3. The display control method according to claim 1, further comprising
arranging the second image at a position corresponding to a pitch of the note corresponding to the synthesized sound, the synthesized sound being immediately before the sound effect.

4. The display control method according to claim 1, wherein
the first image includes a note image whose length on the time axis is set in accordance with a duration of the note.

5. The display control method according to claim 4, wherein
the first image further includes a waveform image representing a waveform in the synthesized sound.

6. The display control method according to claim 4, wherein
the first image further includes a pitch image representing a temporal change in a pitch of the synthesized sound.

7. The display control method according to claim 1, wherein
the second image includes a waveform image representing a waveform of the sound effect.

8. A display control device comprising:
an electronic controller including at least one processor,
the electronic controller being configured to execute a display control module that causes a display device to display a processing image in which a first image representing a note corresponding to a synthesized sound generated by sound synthesis and a second image representing a sound effect added to the synthesized sound are arranged in an area, in which a pitch axis and a time axis are set, in accordance with synthesis data that specify the synthesized sound and the sound effect.

9. The display control device according to claim 8, wherein
the display control module arranges the second image at a position corresponding to a pitch of the note corresponding to the synthesized sound, and the synthesized sound immediately follows the sound effect.

10. The display control device according to claim 8, wherein
the display control module arranges the second image at a position corresponding to a pitch of the note corresponding to the synthesized sound, and the synthesized sound is immediately before the sound effect.

11. The display control device according to claim 8, wherein
the first image includes a note image whose length on the time axis is set in accordance with a duration of the note.

12. The display control device according to claim 11, wherein
the first image further includes a waveform image representing a waveform of the synthesized sound.

13. The display control device according to claim 11, wherein
the first image further includes a pitch image representing a temporal change in a pitch of the synthesized sound.

14. The display control device according to claim 8, wherein
the second image includes a waveform image representing a waveform of the sound effect.

15. A non-transitory computer-readable medium storing a program that causes a computer to execute a process, the process comprising:
causing a display device to display a processing image in which a first image representing a note corresponding to a synthesized sound generated by sound synthesis and a second image representing a sound effect added to the synthesized sound are arranged in an area, in which a pitch axis and a time axis are set, in accordance with synthesis data that specify the synthesized sound and the sound effect.

* * * * *